United States Patent [19]

Irani

[11] 3,993,735
[45] Nov. 23, 1976

[54] CLEANUP OF WET PROCESS PHOSPHORIC ACID

[75] Inventor: Mazin R. Irani, Tarrytown, N.Y.

[73] Assignee: Stauffer Chemical Company, Westport, Conn.

[22] Filed: Aug. 14, 1975

[21] Appl. No.: 604,518

[52] U.S. Cl............................................ 423/321 R
[51] Int. Cl.² ........................................ C01B 25/16
[58] Field of Search .................. 423/305, 307–313, 423/321, 321 S, 490; 204/180 R

[56] References Cited
UNITED STATES PATENTS

| | | | |
|---|---|---|---|
| 1,981,145 | 11/1934 | Keller .................................. | 423/321 |
| 2,044,940 | 6/1936 | Haog et al. .......................... | 423/321 |
| 3,645,682 | 2/1972 | Cochran .............................. | 423/321 |
| 3,872,215 | 3/1975 | Cherdron et al.................... | 423/309 |

FOREIGN PATENTS OR APPLICATIONS 1,284,404   12/1968   Germany ............................ 423/321

OTHER PUBLICATIONS

Ionics Bulletin, L–2, p. 3.

*Primary Examiner*—Oscar R. Vertiz
*Assistant Examiner*—Gregory A. Heller
*Attorney, Agent, or Firm*—Charles B. Rodman

[57] ABSTRACT

A method for purifying a crude or wet process phosphoric acid to a technical grade phosphoric acid comprising a sequence of steps including diluting the crude phosphoric acid, contacting the crude phosphoric acid with activated carbon, neutralization of the acid to a phosphate salt solution, contacting the phosphate salt solution with activated carbon and reconversion to a purified technical grade phosphoric acid.

10 Claims, No Drawings

3,993,735

CLEANUP OF WET PROCESS PHOSPHORIC ACID

BACKGROUND OF THE INVENTION

In the manufacture of wet process phosphoric acid, no matter how pure the raw materials used in its manufacture may be, the phosphoric acid thereby produced, if contemplated for use in food and high grade chemical purposes, must be purified. The procedure and number of steps required in the purification of wet process phosphoric acid depend upon the method employed in manufacturing the acid and the ultimate use of the products. For example, technical grade phosphoric acid is suitable for most applications except for food and pharmaceutical purposes. A typical analysis appears in the table below:

| TYPICAL ANALYSES OF PHOSPHORIC ACID[1] | | |
|---|---|---|
| Constituent | Crude Acid (Green Acid) (Wt. %) | Technical Grade (Wt. %) |
| $P_2O_5$ | 32 | 32 |
| $SO_4$ | 2.50 | 0.10 |
| Si | 0.06 | 0.03 |
| F | 0.20 | 0.05 |
| Cl | 0.02 | 0.002 |
| Fe | 0.60 | 0.003 |
| Al | 0.50 | 0.003 |
| Ca | 0.80 | 0.002 |
| Mg | 0.30 | 0.001 |
| As | 0.001 | 0.001 |
| Pb | 0.005 | 0.001 |

[1]Slack, Phosphoric Acid, Vol. 1, Part II, P. 722 (Marcel Dekker - 1968).

Impurities commonly found in wet process phosphoric acid include dissolved and suspended materials, both organic and inorganic in nature. Sources of these contaminants come from phosphate rock, reagents used during the beneficiation of the rock, the sulfuric acid, and processing equipment that is physically and chemically attacked during manufacturing steps. The relative amounts of these impurities, therefore, vary considerably among producers who use different raw materials and production methods.

Phosphate rock is the principal source of most of the many dissolved impurities in wet process acid. More than 50 chemical elements have been identified in sedimentary and igneous apatitic ores. However, only a relatively small number are troublesome impurities in conventional wet process acid manufacture. These create sludge. This important group of interfering impurities are almost universally distributed in sedimentary phosphate rocks from nearly all geographical sources, but they do not occur in the same mineral forms in all ores. Therefore, because of the universal distribution of the few important impurity elements, most wet process acid producers have some sludge problems in common, even though their phosphate ores are obtained from widely separated and unrelated sources.

Collectively, the chemical compositions of the sludge solids which have been reported in the literature include iron, aluminum, fluorine, silica, calcium, magnesium, potassium and sodium from phosphate rock, and sulfur trioxide and $P_2O_5$ from the acids.

Secondary sources of impurities also occur as chemical additives in beneficiation, in the sulfuric acid, and by the corrosion and erosion of equipment. These differ with each producer. For example, additional organic matter may be introduced into the wet process acid as organic dispersants, flotation agents, and conditioners that are adsorbed on beneficiated concentrates or as anti-foaming agents added in the acidulation step. The sulfuric acid can also contribute to the impurity content by containing small amounts of Fe, Al, Ca, Mg, Si, Mn, Cu, Zn, Pb, and As as have been identified in smelter acids which are frequently used in wet process acid manufacture. Metallic corrosion products from process equipment, particularly iron, may also contribute significantly to the amounts of dissolved or suspended impurities.

No systematic classification of the impurities contributed by these secondary sources is possible, since processing steps and types of chemical reagents differ widely among producers.

Excessive amounts of impurities can have several adverse effects on the phosphoric acid produced. Among these include the impartation of undesired color or turbidity, change of physical characteristics such as viscosity and density and, as already noted, sludge formation.

Numerous methods have been proposed for purifying wet process acid, however, none have been completely effective, although progress has been made. Various methods have been used, including settling and centrifugation, often with the use of flocculating agents. Other methods proposed include the addition of fluosilicic acid to remove potassium, the use of chelating agents to sequester iron and aluminum, high shear agitation, rapid cooling, addition of ammonia, addition of free sulfuric acid, addition of sludge as seed material, and the addition of a gelling type clay to restrict crystal growth and suspend precipitated impurities. None of these operations appear to be in widespread use.

SUMMARY OF THE INVENTION

The present invention relates to a method for purifying a crude or wet process phosphoric acid to a technical grade phosphoric acid. More particularly, the present invention utilizes a purifying operation involving a sequence of steps including dilution of the crude phosphoric acid, contacting the acid with activated carbon, neutralization of the acid to a phosphate salt solution, filtration, contacting the phosphate salt solution with activated carbon and, finally, reconversion to a purified phosphoric acid.

DESCRIPTION OF THE PREFERRED EMBODIMENTS

In accordance with the present invention, a crude or wet process phosphoric acid is diluted with water to a concentration varing from about 5% $P_2O_5$ to about 30% $P_2O_5$. Diluting the acid to a lower concentration is advantageous in that it lowers its viscosity, makes it easier to work with in the subsequent purification steps and reduces the acid's ability to damage operating equipment. Additionally, diluting the acid makes it easier to separate gypsum, silica and other suspended particles. This separation is conveniently accomplished by screening, filtration, centrifugation and the like.

The diluted phosphoric acid, after separating the suspended particles is contacted with activated carbon. The purpose of the carbon contacting step is to remove high molecular weight organic matter which can cause frothing during subsequent purification steps. This high molecular weight organic material is generally present in the uncalcined phosphate rock, and is carried over into the wet process acid. In some cases organic material is also carried over from calcined phosphate rock.

As a general rule, this activated carbon contacting step can be eliminated where the high molecular weight organic content constitutes less than 0.08 weight percent and most preferably, less than 0.04 weight percent.

The activated carbon used to contact the acid can be in the form of a column wherein the acid is passed through, or alternatively, particles of activated carbon can be mixed directly with the acid. When activated carbon particles are mixed directly with the phosphoric acid, they must be separated by either screening, filtration, centrifugation, and the like, before proceeding further.

The phosphoric acid is next neutralized to a pH varying between about 5 and about 9, preferably about 6 to about 8, thereby producing a phosphate salt solution.

The purpose of the neutralization step is to produce soluble phosphate salts which stay in solution and which will precipitate undesirable metal salts such as zinc, cadmium, nickel, vanadium, copper, aluminum, magnesium, and the like, in the form of phosphates, carbonates, and hydrated oxides. An additional purpose of the neutralization step is to allow the use of activated carbon in a subsequent step in a manner wherein it will operate most effectively, i.e., in a close to or neutral solution.

In general, the phosphoric acid neutralization can be accomplished in at least three ways. The first approach for neutralizing the phosphoric acid is accomplished by contacting with an alkali such as sodium hydroxide, sodium carbonate, sodium bicarbonate, potassium carbonate, potassium bicarbonate, ammonina, ammonium hydroxide, ammonium carbonate, ammonium bicarbonate, ammonium carbonate, and other equivalent alkalis in amounts sufficient to produce a soluble alkali phosphate in the desired pH range. Anion mixtures of the individual alkali cations can also be used.

The alkali phosphate solution can be a mixture of mono- and dialkali phosphates, with their existence and ratio dependant upon the particular pH reached. For example, when an alkali such as sodium carbonate, sodium hydroxide, or mixtures thereof is used to reach a pH of 6.55 at an original $P_2O_5$ concentration of 25%, this will result in a molar ratio of mono- to disodium phosphate of about 1:2.

The crude phosphoric acid can also be neutralized to the proper pH by contacting it with a sodium, potassium, or ammonium-loaded ion exchange resin to raise the pH to form a solution of alkali phosphate salts.

The contacting of the phosphoric acid with the alkali metal loaded ion exchange resin can occur in a column, or the ion exchange resin particles can be admixed directly with the phosphate salt solution. If direct admixture of the ion exchange resin particles is chosen, then a separation operation is necessary to remove the resin particles before further treatment of the phosphate salt solution can occur. This can be conveniently accomplished by screening, filtration, centrifugation, and the like.

During the contacting of the phosphoric acid with the alkali metal loaded ion exchange resin, hydrogen ions from the phosphoric acid replace the alkali metal ions on the resin, thus converting it from th alkali metal form to a hydrogen loaded form. The ion exchange resin converted to a hydrogen loaded form can be used in a subsequent step for conversion of the alkali phosphate solution back to phosphoric acid.

Alternatively, neutralization of phosphoric acid by means of ion exchange can be accomplished with electrodialysis. The phosphoric acid is placed in a chamber wherein electrolytes are transferred through an ion-selective semi-permeable membrane to accomplish the neutralization by means of electrical energy. This procedure is well known and described, for example, in Kirk-Othmer's *Encyclopedia of Chemical Technology*, 2nd Edition Vol. 7, at pages 846–865 (Interscience 1963).

The undesirable metal salts which have precipitated during the neutralization step are also separated by screening, filtration, centrifugation, or other equivalent means. The resulting phosphate solution is then contacted with activated carbon by means of passage through an activated carbon column, or by direct admixture with activated carbon particles. The purpose of this activated carbon step is to remove high molecular weight organic material that has a tendency to impart an undesirable gray or brown color. Recommended flow rates, when operating with a column of activated carbon can vary from about 5 to about 50 milliliters of acid per minute per square inch of column at ambient conditions. Operating at a flow rate of about 15 milliliters per minute per square inch of column is especially preferred. In general, operating at higher temperatures, such as about 60° C increases the column efficiency.

The resulting phosphate salt solution is now at a technical grade level and may be used for whatever purposes desired. Should the phosphate salt solution comprise mixed sodium phosphates, they can then be used, for example, for conversion to sodium tripolyphosphate in a manner well known in the art.

If desired, the phosphate salt solution can be conveniently converted to phosphoric acid by contacting the solution with a hydrogen ion loaded cation exchange resin. As discussed earlier, the advantage of this approach is that the alkali metal cationic exchange resin used previously to neutralize the acid becomes converted to a hydrogen ion loaded ion exchange resin which can be recycled to this step for use in the conversion of the phosphate salt solution to phosphoric acid. The hydrogen ion loaded cation exchange resin in converting the phosphate salt solution to phosphoric acid, becomes loaded with the alkali cation of the phosphate salt.

For example, if the phosphate salt solution is a mixture of sodium phosphates, the hydrogen ion loaded cation exchange resin becomes a sodium ion loaded cation exchange resin as a result of the conversion of the phosphate salt solution to phosphoric acid. In practice, it has been found that the ion exchange resins can be recycled about 7 times before regeneration has to be performed on the resin. This regeneration is accomplished by contacting the resin with a dilute solution of a strong alkali, such as NaOH, or a dilute solution of a strong acid, such as HCl.

The contacting of the phosphate salt solution with the $H^+$ ion exchange resin can occur in a column, or the ion exchange resin particles can be admixed directly with the phosphate salt solution. If direct admixture of the ion exchange resin particles is chosen, then a separation step is necessary to remove the resin particles. This can be conveniently accomplished by screening, filtration, centrifugation, and the like.

Electrodialysis can also be employed to convert the phosphate salt solution to phosphoric acid. The phosphate salt solution is placed in a chamber wherein electrolytes are transferred through an ion-selective semipermeable membrane to accomplish conversion of the phosphate salt solution to phosphoric acid by means of electrical energy.

An advantage of the electrodialysis approach is that the neutralization of the crude acid, described earlier, and the conversion of the the phosphate salt solution to a purified phosphoric acid can be accomplished in a single vessel with separate chambers with boundaries designated by ion-selective semi-permeable membranes. Useful byproducts such as $H_2$ and $O_2$ can also be recovered from the electrodialysis operation.

Alternatively, conversion of the phosphate salt solution can be accomplished by contacting the phosphate salt solution with a mineral acid such as sulfuric acid, hydrochloric acid or nitric acid. It is preferred that sulfuric acid be used for converting the phosphate salt solution to phosphoric acid since insoluble sulfates are formed during the conversion. Soluble and excess sulfate ions can be easily removed by precipitation with a barium compound, such as barium hydroxide.

The use of hydrochloric acid or nitric acid is less desirable due to the fact that their use results in the formation of soluble chlorides or soluble nitrates which are more difficult to remove. A final separation step is employed if necessary, to remove any residual suspended particles.

The following examples more particularly illustrate the invention. All parts and percentages are by weight unless otherwise noted.

EXAMPLE 1

500 gms. of wet process $H_3PO_4$ from uncalcined Florida rock containing 64% $P_2O_5$, 9600 ppm F, and 0.24% organic matter, were placed in a 4 liter beaker and diluted with 2300ml. of $H_2O$ giving a brown solution with a sediment containing $SiO_2$ and gypsum. The acid with a $P_2O_5$ content of 11.47% was filtered thru a coarse fritted Buchner funnel yielding a clear brown acid. The acid was then diluted with 200 ml of $H_2O$ and passed thru 1.5 lbs of a 2 ft. × 2 in. activated carbon column (type CAL 12×40 from Calgon Corporation) at a flow rate of about 50 ml/min, producing a clear light green $H_3PO_4$, analyzing 10.67% $P_2O_5$. 400 gms. of $Na_2CO_3$ were added to neutralize the acid thereby raising the pH to a value of 6.6, and a precipitate of insoluble metal salts, hydroxides and oxides were formed. The neutralized acid containing dissolved sodium phosphate salts and the precipitate was filtered. The clear solution was passed thru another 1.5 lb activated carbon column (type CAL 12×40 from Calgon Corp.) for a period of 1 hour. The product was 2900 ml. of a clear mixed sodium phosphate solution. The activated column acted as an agent for removal of organic carbon.

The clear mixed sodium orthophosphate solution was then passed thru an ion exchange column packed with 1 lb. of resin (Amberlite IR-120 from Mallinckrodt), resulting in a water white phosphoric acid solution. The resin was washed with about 100 ml of $H_2O$ to remove any residual phosphoric acid. Final volume=3000ml, density=1.1, $P_2O_5$ content=9.8, F=57ppm, % yield = 92%.

EXAMPLE 2

500 gms. of wet process $H_3PO_4$ from calcined North Carolina rock containing 54% $P_2O_5$, 2800 ppm F, and 0.02% organic matter were diluted with 2300 milliliters of $H_2O$ giving an $H_3PO_4$ solution having a concentration of 10% $P_2O_5$. The acid solution was filtered, giving a clear green solution. This acid was passed thru 1.5 lbs of activated carbon column (type CAL 12×40 from Calgon Corp.) at the rate of 50 ml/min, producing a light green acid, which was then allowed to drip into 340 gms of $Na_2CO_3$. A gray precipitate, comprising metal phosphates, hydroxides and sulfates formed as the pH went up to 6.5. The precipitate was filtered and discarded. The filtrate containing a solution of sodium phosphate with an Na/P ratio of 5/3 was passed at a rate of 50 ml min thru an activated carbon column (type CAL 12×40 from Calgon Corp.) giving a slightly turbid solution. The turbidity was attributed to improper fitration. This solution was then passed thru an ion exchange column packed with 1 lb. of IR-120 Amberlite (from Mallinckrodt) at the rate of 15 ml/minute and resulted in a water white solution of $H_3PO_4$ with a $P_2O_5$ concentration of 10.0%, a density of 1.08 and a fluorine content of 32 ppm by weight of the $H_3P_4$ solution, or 320 ppm by weight of $P_2O_5$. Iron concentration was below 20 ppm. The dilute acid was then concentrated to 42% $P_2O_5$ and a density of 1.34. The fluorine content was found to be 37ppm. The color was very slightly yellowish. Upon treatment with activated carbon, the color disappeared to give 42% $P_2O_5$ acid with F=18 ppm and density=1.34 gm/ml.

Tabulated Results:

| | $P_2O_5$ % | Color | Density | F⁻(ppm) | F⁻(ppm)/$P_2O_5$ |
|---|---|---|---|---|---|
| Starting Acid | 54 | Green | 1.68 | 2800 | 5140 |
| Clean Acid | 10 | Water White | 1.08 | 32 | 320 |
| Clean Acid Concentrated | 42 | V. Slightly Yellow | 1.34 | 37 | 88 |
| Clean Acid Concentrated + Activated Carbon Treatment | 42 | Water White | 1.34 | 18 | 43 |

EXAMPLE 3

500 gms of wet process acid from uncalcined Vernal rock, containing 32.4% $P_2O_5$, 12,300 ppm fluorine and 0.04% organic matter was diluted with 1300 milliliters of $H_2O$ giving an $H_3PO_4$ solution having a concentration of 9.5% $P_2O_5$. The acid solution was filtered thru a medium filter paper. It was then passed thru 1.5 lbs of an activated carbon column (type CAL 12×40 from Calgon Corp.) at the rate of 50 ml/min resulting in a slightly green acid. The acid was neutralized by contacting with 212 gms of $Na_2CO_3$. The neutralized solution had a pH of 6.5 and contained insoluble metal phosphates, hydroxides and sulfates. The insoluble matter was filtered and the resulting slightly yellow solution of sodium phosphate salts was passed through an activated carbon column (CAL 12×40 from Calgon) at a rate of 50 ml/min, giving a water white solution. This solution was passed through an ion exchange resin (Amberlite IR-120 from Mallinckrodt) at the rate of 30 ml/min giving a water white acid. Volume=1950 ml, $P_2O_5$=7.6%, F=316 ppm, density=1.10. The volume was reduced to 430 ml by evaporating the water by distillation, giving a water white acid with a density = 1.19, $P_2O_5$ = 28.9%, F = 131 ppm. 98.7% of the fluorine was removed.

Tabulated Results:

|  | $P_2O_5$ % | Color | Density | F⁻ ppm | $F/P_2O_5$ ppm |
|---|---|---|---|---|---|
| Starting Acid | 34.2 | Green | 1.3 | 12300 | 36000 |
| Clean Acid | 7.6 | Water White | 1.10 | 316 | 4160 |
| Clean Acid | 28.9 | Water White | 1.19 | 131 | 453 |

What is claimed is:

1. A method for the purification of crude or wet process phosphoric acid which comprises:
   a. Diluting the wet process phosphoric acid with water to a concentration varying from about 5 to about 30% $P_2O_5$;
   b. Contacting the dilute acid with activated carbon in amounts sufficient to remove high molecular weight organic impurities;
   c. Neutralizing the acid to a pH varying from about 5 to about 9 by contacting said acid with an alkali selected from the group consisting of sodium hydroxide, sodium carbonate, sodium bicarbonate and mixtures thereof; potassium hydroxide, potassium carbonate, potassium bicarbonate, and mixtures thereof; and ammonia, ammonium hydroxide, ammonium bicarbonate, ammonium carbonate and mixtures thereof;
   d. Contacting the phosphate solution thereby formed, with activated carbon in amounts sufficient to remove high molecular weight organic impurities.

2. The method of claim 1 wherein said neutralization is accomplished by contacting said acid with an ion exchange resin loaded with an alkali metal cation selected from the group consisting of sodium, potassium and ammonium.

3. The method of claim 2 wherein said alkali metal cation exchange resin after neutralization is recycled to the acid conversion step for use as the hydrogen ion loaded cation exchange resin.

4. The method of claim 3 wherein said hydrogen ion loaded cation exchange resin is recycled for use in the neutralization step as the alkali metal cation exchange resin.

5. The method of claim 1 wherein said neutralization is accomplished by means of electrodialysis.

6. The method of claim 1 wherein the conversion to a purified phosphoric acid is accomplished with a mineral acid.

7. The method of claim 6 wherein said mineral acid is sulfuric acid.

8. The method of claim 1 wherein the conversion to a purified phosphoric acid is accomplished with a hydrogen loaded cation exchange resin.

9. The method of claim 1 wherein the conversion to a purified phosphoric acid is accomplished with electrodialysis.

10. The method of claim 1 wherein the purified phosphoric acid is of a technical grade.

* * * * *

UNITED STATES PATENT AND TRADEMARK OFFICE
CERTIFICATE OF CORRECTION

PATENT NO. : 3,993,735
DATED : Nov. 23, 1976
INVENTOR(S) : Mazin R. Irani

It is certified that error appears in the above-identified patent and that said Letters Patent are hereby corrected as shown below:

Col. 3, Line 66, "th" should --the--;
Col. 6, Line 35, "$H_3P_4$" should be --$H_3PO_4$--;
In the Claims: Claim 1, Col. 8, subheading "e." is omitted, and should be as follows: --e. Converting the phosphate solution to a purified phosphoric acid.--

Signed and Sealed this second Day of August 1977

[SEAL]

Attest:

RUTH C. MASON
*Attesting Officer*

C. MARSHALL DANN
*Commissioner of Patents and Trademarks*